Figure 1:
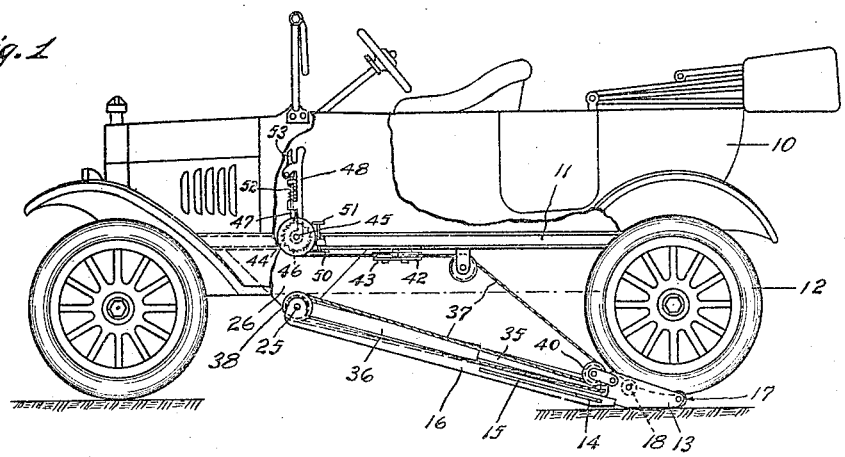

Feb. 5, 1924.　　　　　T. A. ARNOLD　　　　　1,482,538
EMERGENCY BRAKE FOR MOTOR VEHICLES
Filed Oct. 24, 1921　　　2 Sheets-Sheet 1

INVENTOR
THOMAS A. ARNOLD
BY
Fred C. Mathews
ATTORNEY

Feb. 5, 1924.  
T. A. ARNOLD  
1,482,538  
EMERGENCY BRAKE FOR MOTOR VEHICLES  
Filed Oct. 24, 1921  
2 Sheets-Sheet 2
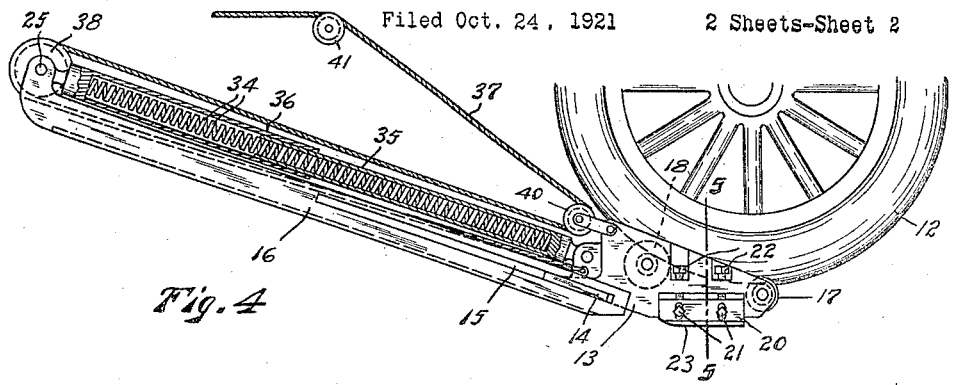
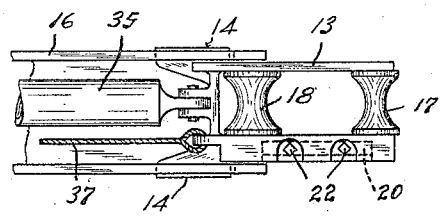
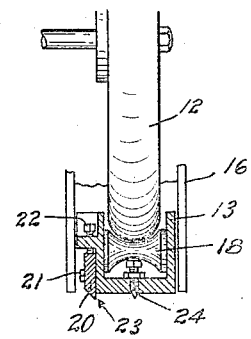
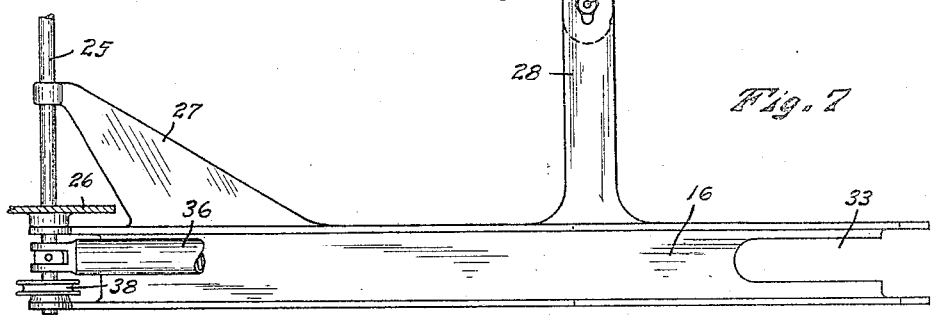
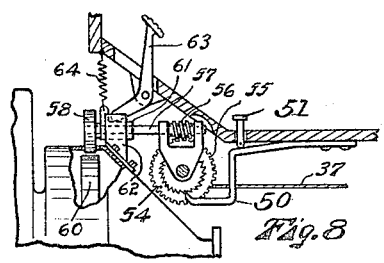
INVENTOR  
THOMAS A. ARNOLD  
BY  
Fred C. Matheny  
ATTORNEY Patented Feb. 5, 1924.

1,482,538

UNITED STATES PATENT OFFICE.

THOMAS A. ARNOLD, OF TACOMA, WASHINGTON.

EMERGENCY BRAKE FOR MOTOR VEHICLES.

Application filed October 24, 1921. Serial No. 509,881.

*To all whom it may concern:*

Be it known that I, THOMAS A. ARNOLD, a citizen of the Dominion of Canada, residing at Tacoma, in the county of Pierce and State of Washington, have invented certain new and useful Improvements in Emergency Brakes for Motor Vehicles, of which the following is a specification.

This invention relates to improvements in emergency brake mechanism for motor vehicles and the object of this improvement is to provide quickly and easily operated means for lifting the rear wheels of a motor vehicle off of the road bed and supporting the weight of the rear end of the vehicle on shoes or skids in case it is desired to stop quickly or to arrest skidding movement of the vehicle.

Another object is to provide a brake shoe that may be dropped or lowered in such a manner that the rear wheels of the vehicle will run up onto and be carried on the brake shoe and to provide suitable means on the brake shoe in the form of rollers or equivalent devices for preventing frictional wear on the tires of the wheels, if the wheels continue to rotate after they run up onto the shoes, the said wear preventing means being arranged in inclined position so that if the vehicle is stopped with the wheels resting on the shoes, gravity or the weight of the vehicle will tend to cause the wheels to move rearwardly off of the brake shoe.

Another object is to provide a brake shoe of this type having adjustable means for preventing side skidding and having other adjustable means for digging or gouging into the road bed and retarding forward movement of the shoe.

Another object is to provide strong and substantial means for supporting the brake shoe either in a raised or lowered position, said means preferably being disposed just below the running board on the side of the vehicle, so that it will not be conspicuous and will be out of the way when it is not in use.

A further object is to provide efficient and easily operated cable devices for lifting the brake mechanism and for holding the same in an inoperative or raised position, the said lifting means being either manually operated or power operated, and to provide means for instantly releasing the holding devices to permit the application of the brake.

Still further and more specific objects are to provide emergency brake mechanism of this nature that is strong and simple in construction, reliable and efficient in operation, applicable to motor cars of the usual standard form of construction, not expensive to manufacture or install and easy to operate in case of an emergency.

This device is designed to prevent accidents and to save wear and tear on tires by lifting the rear wheels of a vehicle clear of the ground or road bed, and thereby supporting the rear end of the vehicle on shoes or skids that can only move by sliding on the ground and that are provided with adjustable spikes and devices for digging or gouging into the road bed to thereby offer the greatest possible resistance to forward or sidewise movement of the vehicle.

Figure 2:
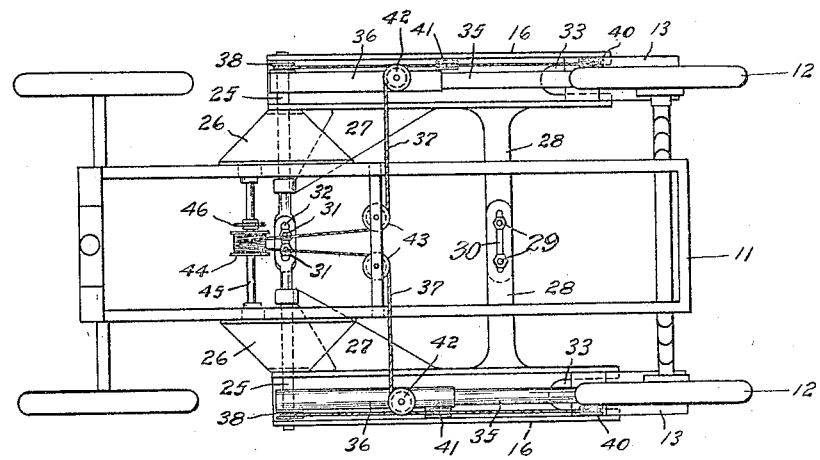
Figure 3:
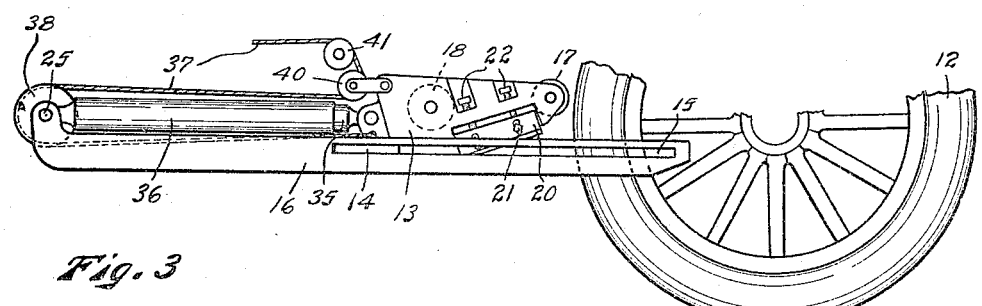

In the accompanying drawings, Figure 1, is a view in side elevation of a motor vehicle having an emergency brake, constructed in accordance with this invention, installed thereon, the brake being shown in an operative position: Fig. 2, is a plan view of the running gear of the same motor vehicle showing the brake in the operative or applied position: Fig. 3, is a detached view in elevation showing the brake in an inoperative or raised position: Fig. 4, is a detached view partly in elevation and partly in cross section showing an operative or lowered position of the brake mechanism: Fig. 5, is a sectional view substantially on broken line 5, 5 of Fig. 4 showing the wheel in elevation: Fig. 6 is a plan view of one of the brake shoes showing the shoe supporting devices broken away: Fig. 7 is a detached plan view of one of the devices for supporting the brake shoe, and Fig. 8 is a fragmentary view in elevation illustrating one form of mechanism by the use of which power from the motor of the vehicle may be utilized for drawing the brake shoes out from under the vehicle wheels and lifting the brake devices.

Like reference numerals designate like parts throughout the several views.

In the drawings, I have shown this brake mechanism as applied to a motor vehicle including a body 10, supported on a frame 11, that is mounted on wheels 12, the brake mechanism being in duplicate on the two sides of the vehicle so that the following description applies to the brake devices on either side.

The brake mechanism on each side includes a shoe 13, preferably of channel shaped cross section as shown in Fig. 5, that is provided near its front end and on opposite sides with outwardly projecting flanges 14, that are slidably disposed within slots 15, in the sides of a brake shoe supporting member 16, which is also preferably of channel shaped cross section so that the shoe may move lengthwise thereof into the operative position shown in Figs. 1 and 4 or into the retracted or inoperative position shown in Fig. 3.

The shoe 13, is provided with two or more transversely arranged rollers 17 and 18, that are preferably of larger diameter near the ends and of smaller diameter at the centres to fit the curvature of a tire and that are mounted between the two side flanges of the shoe in such a manner that when the shoe is lowered in front of a wheel the wheel will run up onto the rollers and may continue to revolve without doing damage to the tire. The rollers are positioned so that when the brake is in operation the end roller will be substantially below the center of the vehicle wheel or a slight distance to the rear of the vertical line that passes through the center of the vehicle wheel so that as soon as the vehicle is stopped or reversed it will have a tendency to back off of the emergency brake shoes.

The brake shoe 13, may be provided on one side with a plate 20, that is supported for vertical adjustment on the shoe by screws 21, and 22, and that is provided with a sharp edge 23, which projects below the bottom surface of the shoe and is arranged to dig into the roadbed on which the shoe rests to prevent sidewise skidding of the vehicle. The shoe 13, may also be provided with any desired number of adjustable spikes 24, that may project outwardly from the bottom of such shoe to dig into the roadbed and offer resistance to movement of the shoe in any direction. The spikes 24, and non-skid plates 20, are especially advantageous for use on roads or pavements that are covered with ice and are made adjustable so that they may be set relatively shallow for use on pavements and deeper for use on earthen roads.

The shoe supporting members 16, on opposite sides of the vehicle are secured at their forward ends to a transverse bar or shaft 25, that is supported in brackets 26, that are rigidly secured to the vehicle frame 11. The shoe supporting members 16, are also preferably provided near the front end with integral or otherwise rigidly secured truss braces 27, that are connected with the shaft 25, toward the center of such shaft to make a more rigid connection for the shoe supporting members. The shoe supporting members on opposite sides are adjustably connected with each other near their rear ends by cross bars 28, that overlap as shown in Figs. 2 and 7 and are made fast to each other by bolts 29, that pass through slots 30. The shaft 25, is preferably made in two pieces having overlapping flattened inner ends that are adjustably secured together by bolts 31, that pass through slots 32. By adjusting the two parts of the shaft 25, and the two cross bars 28, the shoe supporting members 16, and the shoes carried on the rear ends thereof, can be moved into the exact alignment desired with respect to the rear vehicle wheels.

The rear ends of the shoe supporting members 16, are slotted or cut away as at 33, so that they will clear the tires on the vehicle wheels when the brake mechanism is in the raised or inoperative position.

Each brake shoe is urged rearwardly to the limit of its movement by a compression spring 34, that is disposed within telescopically arranged tubes 35 and 36, one of which is secured to the brake shoe and the other of which is secured to the shaft 25, or to the upper end of the shoe supporting member.

Each brake member is arranged to be raised and to be held in a raised position by a cable 37, that is secured to the brake shoe 13, thence passes forwardly along the shoe supporting member 16 and over a roller 38, thence rearwardly and over a roller 40, on the shoe 13, thence forwardly and upwardly over rollers 41 and 42, thence inwardly around roller 43 and thence forwardly and is wound on a drum 44. The drum 44 is mounted on a shaft 45, on which is secured a ratchet wheel 46, that is arranged to be engaged by pawl 47, on a hand lever 48, in such a manner that when the hand lever 48, is oscillated, the drum 44, will be rotated. The ratchet wheel 46, is also engaged by a spring pawl 50, on the lower end of a foot piece 51, that preferably projects upwardly through the footboard of the motor vehicle so that it is within easy reach of the driver of the vehicle. The pawl 47, on the hand lever is ordinarily held out of engagement with the teeth of the ratchet wheel 46, by a spring 52, but such pawl is connected with a grip member 53, on the upper end of the hand lever in such a manner as to enable the pawl to be pressed against the ratchet teeth by the grip of the fingers of a person that grasps the upper end of the hand lever. The springlike pawl 50, on the foot piece 51, engages with the teeth of the ratchet wheel at all times except when the foot piece is depressed.

If the emergency brake is in the operative position shown in Figs. 1 and 4 and the drum 44, is rotated by reciprocating the hand lever 48, the cables 37, will be wound onto the drum 44, and will first draw the brake shoes 13, out from under the wheels 12, which rests almost directly over the centers of the rear rollers so that very slight forward movement of the brake shoes will cause such wheels to tend to back off of the brake shoes, and then lift the brake members into an inoperative position as shown in Fig. 3. After the brake members have been raised into an inoperative position as above described they will be thus securely held by the cable 37, until the foot piece 51, is depressed, thereby causing the pawl 50, to release the ratchet wheel whereupon the drum 44, will be free to rotate and the brake members will be free to drop down.

As the brake members are raised by winding in the cables 37, the rollers 17, at the rear ends of the brake shoes 16 will roll on the tires of the vehicle wheels 12 thus avoiding frictional wear on the tire and making the brake members more easy to raise. When the brake members are fully raised the end rollers 17, will be withdrawn from the tires, see Fig. 3, but as soon as the drum 44 is released by pressing down on the foot piece 51 the compression springs 34 will move the shoes 16 rearwardly until the end rollers 17 rest against the tires and, if the vehicle is moving forwardly, the rotation of the wheels will assist in carrying the brake shoes down and under such wheels.

In Fig. 8 I have shown one means that may be used to connect the drum on which the cables 37 are wound with a motor of the vehicle so that the brake mechanism may be raised by the application of power derived from the motor instead of by hand.

Referring specifically to Fig. 8, I have shown a drum 54 having a worm wheel 55 that meshes with a worm 56 on a shaft 57. The forward end of the shaft 57 has a friction wheel 58 that is arranged to make contact with the peripheral portion of the fly wheel 60 of the motor or engine of the vehicle on which this emergency brake is installed. The forward end of the shaft 57 is journaled in a bearing 61 that is movable vertically in a guide 62 and is arranged to be pressed downwardly by a foot lever 63, to cause frictional engagement of the friction wheel 58 and fly wheel 60 but that is normally held clear of the fly wheel, as shown, by a tension spring 64. Any desired gear ratio between the worm 56 and worm wheel 55, may be used to secure the necessary power for lifting the brake mechanism, it being understood that the friction wheel 58 will slip on the fly wheel before a hard enough pull to break the cables 37, is exerted.

The emergency brake mechanism is strong and simple in construction, not expensive to manufacture, may be installed on substantially any type of motor vehicle either at the time such vehicle is manufactured or later, may be applied instantly to stop the vehicle in case of emergency and is not destructive on pneumatic tires.

The foregoing description and the accompanying drawings clearly disclose the principles of construction and the method of operation of this emergency brake, but, while I have shown and described what I now consider to be the preferred embodiment of the invention, it will be understood that the disclosure is merely illustrative and that such changes in the apparatus may be made as are within the scope and spirit of the invention.

What I claim is:

1. Brake apparatus of the class described including brake shoe supporting devices of channel shaped cross section pivoted at their forward ends to the forward portion of a vehicle frame, the side flanges of said brake shoe supporting devices being slotted to form longitudinally extending guideways toward their rear ends, brake shoes movable lengthwise within said brake shoe supporting devices and arranged to receive and support the rear wheels of a vehicle, flanges on the sides of said brake shoes arranged to travel in said slotted guideways, resilient means for urging said brake shoes rearwardly and cable means for moving said brake shoes forwardly.

2. Brake apparatus of the class described including brake shoe supporting devices of channel shaped cross section disposed on opposite sides of a vehicle and pivoted at their forward ends to the forward portion of the vehicle frame, the rear ends of said brake shoe supporting devices each having a slot affording clearance for a vehicle wheel and permitting the brake shoe supporting device to be moved from an inclined to a substantially horizontal position and the side flanges of said brake shoe supporting devices having longitudinal guide slots near their rear ends, a cross bar of adjustable length interconnecting the rear ends of the two brake shoe supporting devices on opposite sides of the vehicle, brake shoes movable lengthwise of said brake shoe supporting devices, flanges on said brake shoes arranged to travel in said guide slots, a spring for urging said brake shoes rearwardly and cable means for moving said brake shoes forwardly.

3. Brake mechanism of the class described including brake shoe supporting devices pivotally connected with a vehicle frame toward the forward end thereof, brake shoes guided for longitudinal movement at the rear ends of said brake shoe supporting devices and arranged to receive and support the rear wheels of the vehicle, springs for urging said brake shoes rearwardly, a pulley on each of said brake shoes, another pulley at the forward end of each of said brake shoe supporting devices, guide pulleys located above said brake shoe supporting devices, a winding drum, means for rotating said winding drum, quickly releasable means for holding said drum in a set position, and a cable secured to said brake shoe, thence passing forwardly over the pulley at the forward end of said brake shoe supporting devices, thence passing rearwardly and around the pulley on said brake shoe and thence passing over said guide pulleys and around said winding drum.

4. Brake apparatus of the class described including a brake shoe movably connected with a vehicle frame and arranged to be lowered beneath the rear wheels of the vehicle, transverse rollers on said brake shoe for supporting said vehicle wheels, a plate adjustably secured to one side of said brake shoe and having a sharp edge arranged to project below the plane of the bottom surface of said brake shoe, and adjustable spike members projecting from the bottom of said brake shoe.

5. Brake apparatus of the class described including brake shoe supporting devices of channel shaped cross section pivoted at their forward ends to the forward portion of a vehicle frame, the side flanges of said brake shoe supporting devices being slotted to form guideways near the rear ends, brake shoes of channel shaped cross section movable lengthwise of said brake shoe supporting devices and having guide flanges that are arranged to travel in said slotted guideways, transverse rollers within said brake shoes for receiving the tires of vehicle wheels that may rest on said shoes, springs for urging said brake shoes rearwardly, cables for moving said brake shoes forwardly, winding drums for said cables and means connected with the motor of the vehicle for rotating said winding drums.

Tacoma, Washington, October 6th, 1921.

THOMAS A. ARNOLD.